United States Patent [19]

Hart

[11] 3,964,094

[45] June 15, 1976

[54] SERVO INFORMATION PATTERN FOR ROTATING HEAD MAGNETIC TAPE UNIT INDEPENDENT OF AMPLITUDE

[75] Inventor: Gary Allen Hart, Boulder, Colo.

[73] Assignee: International Business Machines Corporation, Armonk, N.Y.

[22] Filed: Nov. 7, 1974

[21] Appl. No.: 521,722

[52] U.S. Cl. ............................ 360/77; 360/70; 360/73
[51] Int. Cl.² .................. G11B 21/10; G11B 21/04
[58] Field of Search ................ 360/77, 76, 21, 70, 360/73

[56] References Cited
UNITED STATES PATENTS

| | | | |
|---|---|---|---|
| 2,938,962 | 5/1960 | Konins | 360/76 |
| 3,175,205 | 3/1965 | Avyang | 360/77 |
| 3,185,972 | 5/1965 | Sippel | 360/76 |
| 3,210,464 | 10/1965 | Felgel-Farnholz | 360/36 |
| 3,666,897 | 5/1972 | Harr | 360/84 |
| 3,686,649 | 8/1972 | Behr | 360/77 |
| 3,845,500 | 10/1974 | Hart | 360/77 |

Primary Examiner—Bernard Konick
Assistant Examiner—Alan Faber
Attorney, Agent, or Firm—Joscelyn G. Cockburn; Francis A. Sirr

[57] ABSTRACT

The position of a length of magnetic recording tape, adjacent a rotating head device, is servo controlled to accurately position a transverse tape data track in alignment with the head path. The tape includes two distinctive servo indicia. The first indicia is a magnetic flux transition which is oriented substantially parallel to the edge of the tape. The second indicia is a magnetic flux transition which is oriented at an angle to the edge of the tape. This second indicia is parallel to the magnetic flux transitions which comprise the data track, and said distinctive second indicia is provided for each data track to define the physical location thereof. The rotating head includes two head gaps, one of which is parallel to the first indicia, and the other of which is parallel to the second indicia. The head gaps angular relationship insures that the respective head gaps will read only that indicia which is parallel therewith. The time of crossing of each head gap with its readable indicia is a measure of head-track to data-track alignment.

20 Claims, 8 Drawing Figures

SERVO INFORMATION PATTERN FOR ROTATING HEAD MAGNETIC TAPE UNIT INDEPENDENT OF AMPLITUDE

Background of the Invention

1. Field of the Invention

This invention relates to magnetic tape units employing one or more rotating heads which record and/or reproduce machine-convertible information while moving in transducing relationship with a magnetic web or tape, this information being oriented as magnetic flux transitions to form data tracks which extend generally transverse to the longitudinal tape length.

2. Prior Art

Rotating head magnetic tape units are widely known. In one form a generally cylindrical mandrel or drum includes a rotating head wheel which carries one or more read/write heads. The magnetic tape engages the mandrel at one point, makes a helical wrap about at least a portion of the mandrel, and exits the mandrel at a point which is both axially and circumferentially spaced from the entrance point. The angle of helical tape wrap can vary in accordance with design choice, but is usually between 180° and 360°. The head wheel rotates so as to sweep its magnetic head or heads transversely across the tape. The angle at which the head enters and exits the tape may vary, in accordance with design choice, from slightly less than 90° to a small angle, such as 15°.

Another form of device is one wherein the head wheel is associated with a tape guiding structure which bends the tape transversely into an arcuate shape that conforms to the circumferential shape of the head wheel. In this device the tape travels in a generally straight line past the head wheel, and is transversely bent by the associated guides as it enters the head wheel area.

The present invention finds utility with either aforementioned type of device, and has been found particularly useful with the helical wrap device.

A major problem encountered in the aforementioned devices is that of establishing and maintaining accurate positional alignment between the path of the head wheel and the tape's transverse data track. This is particularly true when a data track is written on one tape unit and later read by another tape unit.

To facilitate servo control of the tape's position, so as to maintain proper head/track alignment, the tape is provided with one or more longitudinal servo tracks. Such a track functions to identify the position at which the rotating head should enter and/or exit the tape in order for the head to track the proper transverse path across the tape.

One such prior art device includes an edge-disposed control track having servo information in the form of gaps. This control track, including the gaps, is read by the rotating head. The control track, and the gaps, provide a means for measuring head/track alignment.

Although the prior art servo patterns function adequately for the purpose for which they were intended, several inherent problems affect the reliability of these systems.

Probably one of the most pressing problems of the prior art servo schemes is the fact that these servo schemes are amplitude dependent, i.e., the means by which a head/track alignment is effectuated is amplitude sensitive. As such any defects which affect the amplitude of the output signal from the head will adversely affect the head/track alignment.

As is well known to one skilled in the art, there are several problems in the head/track alignment technology which will adversely affect the amplitude of the output signal from a magnetic head. For example, media defects will adversely affect the signal amplitude from a magnetic head. As is well known when the magnetic tape surface is normal, i.e., free of defects, the output signal from the servo track which is used for head/track alignment is symmetrical to a reference point. Usually the reference point is a syncmark along the servo track. However, whenever the tape surface is defective due to foreign matter adhering to the tape or scratches which obliterate the servo indicia, the symmetry of the servo signal changes with respect to the reference point. The net result is that the signal for head/track alignment is incorrect.

Another problem which affects the amplitude of the servo signal for head/track alignment is the differences of head amplitude. The perpendicular distance between the head and the tape is not necessarily constant across the width of the head. As noted earlier, the head/track alignment is amplitude sensitive and since the difference in flying height affects the amplitude of the signal from the servo head, the head/track alignment information will be inaccurate.

The present invention is an improved servo apparatus and means of this general type whereby the rotating head cooperates with a unique tape servo track format to measure and determine head/track alignment free of amplitude dependency.

Objects of the Invention

It is, therefore, an object of this invention to align a magnetic head with a data track in a more efficient manner than has heretofore been possible.

It is another object of the invention to provide a head/track alignment servo scheme which is independent of amplitude.

It is still another object of the invention to provide a head/track alignment servo scheme which is insensitive to tape defects.

It is a further object of this invention to provide a head/track alignment servo scheme which is insensitive to differences in head flying heights.

Summary of the Invention

The present invention employs a distinctive servo track format having at least two separate magnetic flux transitions which are physically oriented at different angles, such that two head gaps similarly oriented, will read only its parallel transition. Thus, the times at which the head gap crosses its readable indicia is a measure of the positional relationship of the rotating head to the servo track format. This arrangement is not signal amplitude sensitive.

In a preferred arrangement, the physical spacing of these two magnetic flux transistions is equal to the effective spacing of the two head gaps. Thus, the two transitions are read simultaneously and the arrangement is insensitive to head speed.

In an alternative arrangement of the present invention the physical angle or spacing between the two flux transitional paths on the tape or magnetic media, is not identical to the physical angle or spacing between the two head gaps. However, an electrical delay is inserted between one of the head openings and the servo detection circuitry to compensate for the differences in spacing between the head openings and the flux transitional paths on the tape. This delay also functions as a means for adjusting the mechanical differences from machine-to-machine.

More specifically, the present invention provides a first flux transition which extends in a first direction, for example, generally parallel to the edge of tape. A second flux transition extends in a substantially different direction, for example, generally parallel to the flux transitions comprising a transverse data track. This servo format is read by two similarly aligned head gaps, the angular relationship of these gaps being such as to insure that a gap derives a usable signal only from its parallel transition. The time at which each gap crosses its readable transition is a measure of the alignment of the head track to the transverse data track.

In one form of the present invention a single second flux transition defines the center of a data track whereas the first flux transition comprises a single transition, running the length of tape, and parallel to the edge thereof.

The foregoing and other objects, features and advantages of the invention will become apparent from the following more particular description of the preferred embodiment, as shown in the accompanying drawing.

Description of the Preferred Embodiments

Figure 1:
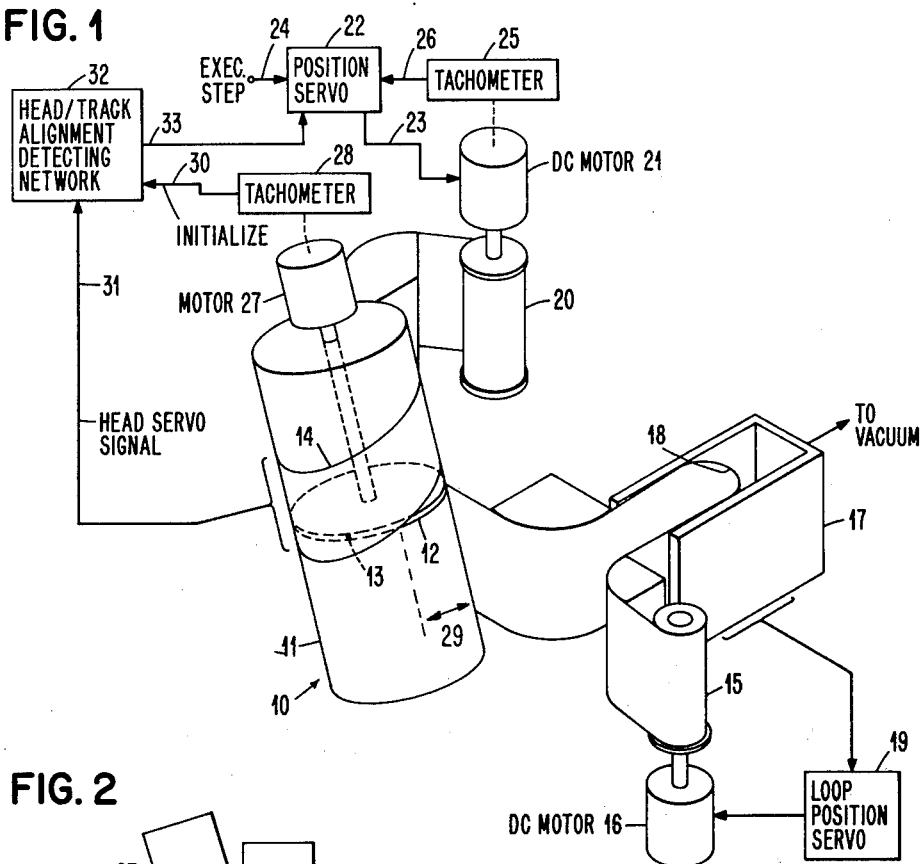
FIG. 1 discloses a rotating head magnetic tape unit whose take-up spool DC motor is controlled in accordance with the present invention.
Figure 2:
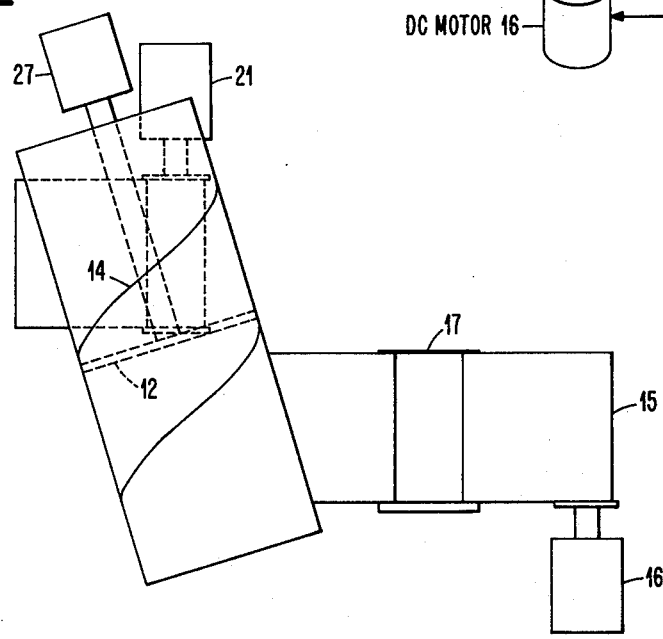
FIG. 2 is another view of FIG. 1's tape path.

FIG. 1 discloses a helical wrap rotating head magnetic tape unit incorporating the present head-to-track alignment servo invention. More particularly, this device may be of the type more completely described in the copending application of P. J. Arseneault et al. Ser. No. 375,966 filed July 2, 1973, now abandoned, and commonly assigned. As more particularly described therein, this rotating head magnetic tape unit includes a tape processing station 10 in the form of a two-section mandrel 11 having an intermediate rotating head wheel 12 which carries a magnetic transducer or head 13. A length of tape 14 is helically wrapped about the center of mandrel 11 and head 13 traces a transverse path across this length of tape.

A tape supply is contained on supply spool 15. This spool is controlled by direct current motor 16. As tape leaves spool 15, a length of the tape is maintained in vacuum column 17. This vacuum column serves to maintain one end of the processing stations's tape under constant tension. Tape loop 18, contained within the vacuum column, is position-monitored by loop position servo 19. This servo in turn controls the energization of motor 16 to maintain an optimum loop length within the column. This loop position sensor, which may be of the type described in U.S. Pat. No. 3,122,332 to F. G. Hughes, Jr., provides bidirectional and variable magnitude energization of motor 16, thereby maintaining loop 18 at an optimum position, as the tape moves in either direction relative to supply spool 15. The other end of the tape length 14 which extends through tape processing station 10 is maintained under tension by way of take-up spool 20 and direct current spool motor 21.

The present invention will be described in the environment of an incrementing tape unit, that is a tape unit which produces step-by-step rotation of spool 20, maintaining the tape stationary adjacent head wheel 12 as a read/write function is performed by head 13. However, the present invention is not to be restricted to this configuration since, generically, this configuration can be defined as one in which the tape motion is very slow when compared to the motion of head 13. More particularly, the linear speed of head 13 relative to stationary tape 14 is approximately 1,000 inches per second. Within the teachings of the present invention, the tape section 14 may remain stationary as the head sweeps the tape, or may move at a relatively low speed, such as, for example, 10 inches per second.

The incremental or step-by-step positioning of tape section 14 relative to the path of head wheel 12 is controlled by position servo 22 whose output 23 is operable to energize motor 21. More particularly, position servo 22 receives a request to execute a given movement step on conductor 24. This input signal results in energization of motor 21. Motor tachometer 25 provides a closed loop servo feedback on conductor 26 to which the requested step command is compared. As a result, motor energization is terminated upon the completion of the requested step. More particularly, this above-described servo apparatus may be as described in the copending application of H. C. Jackson, Ser. No. 391,405, filed Aug. 24, 1974, now U.S. Pat. No. 3,864,739, and commonly assigned.

Head wheel 12 is driven by motor 27 and rotates at a constant speed. This motor also controls the rotation of tachometer or encoder 28. This tachometer functions to determine the instantaneous rotational position of head 13 in its 360° path. With reference to FIG. 1, it can be seen that helical tape wrap 14, about mandrel 11, includes a gap 29. At this rotational position, the head is not cooperating with the tape, but rather is moving at a high speed toward an edge of the tape, preparatory to beginning a transverse sweep across the tape. As will be explained subsequently, the signal derived from gap 29 is used for initializing the head/track alignment detecting network. One of the functions of tachometer 28 is to provide an output signal on conductor 30 indicating that head 13 is about to begin a sweep across the helical tape wrap.

Figure 5:
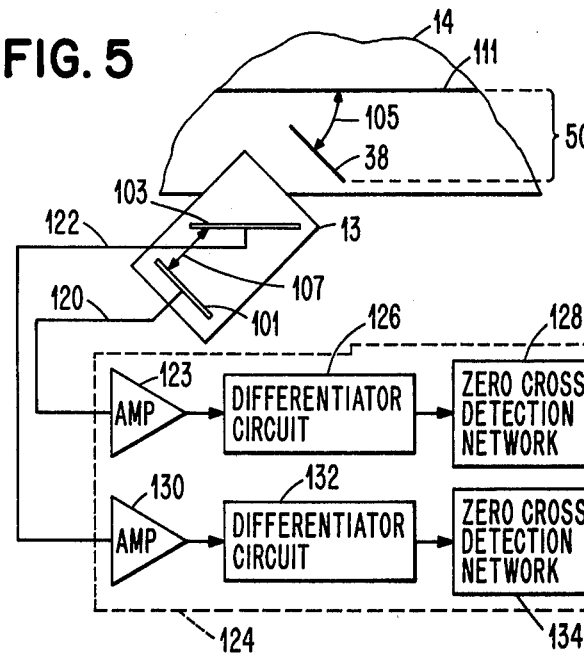
FIG. 5 is an enlarged view of the tape's servo format, FIGS. 3 and 4, showing this format associated with the rotating head and a head/track alignment detecting network constructed in accordance with the present invention.
Figure 6:
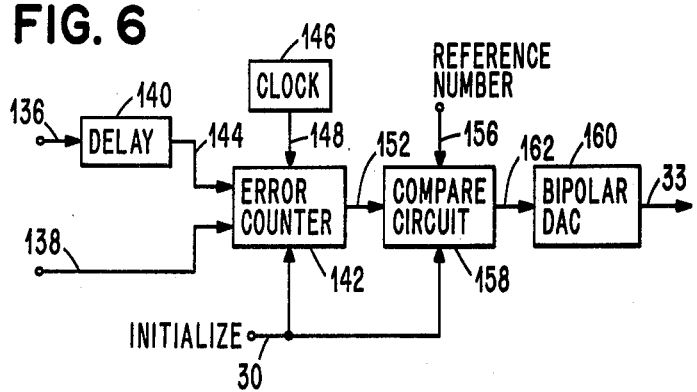
FIG. 6 shows a detailed circuit diagram of the threshold network circuit.

As will be apparent from the following description, the present invention provides a pair of head envelope signals on conductor 31, which signals are provided as inputs to head/track alignment detecting network 32. This network is effective to originate a head/track alignment error, if one exists, on conductor 33. The detailed circuitry of detecting network 32 is shown in FIGS. 5 and 6. This signal controls fine positioning of motor 21 by way of position servo 22, to correct any error in alignment between the path of head wheel 12 and a particular transverse data path carried by the helical wrap of tape.

Figure 3:
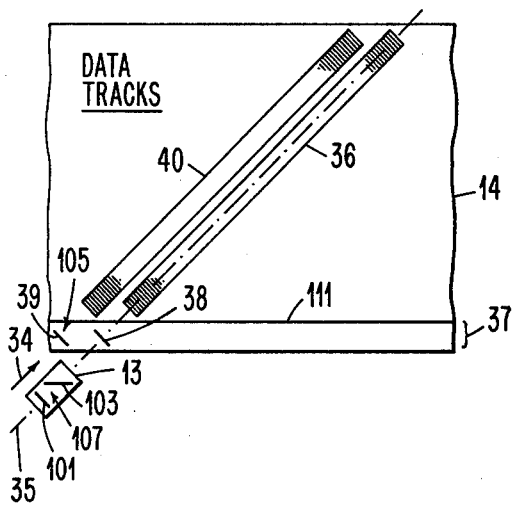
FIG. 3 shows a simple form of the tape's transverse data track and longitudinal servo track format.

FIG. 3 shows in diagrammatic form the tape's data track and servo track format, according to the present invention. In this arrangement, head 13 is shown moving in the direction of arrow 34 along the ideal head path identified by broken line 35. This head path is termed "ideal" in that it coincides with the center of transverse data track 36. Thus, as head 13 follows path 35, the data contained within track 36 will be accurately transduced, this term including either the read or the write function. Still referring to FIG. 3, head 13, hereinafter called readings means 13, comprises opening 101 and opening 103. The function of openings 101 and 103 is to read the servo information in the servo track 37, and the information is used for aligning reading means 13 with transverse data track 36. Although reading means 13 is depicted as a single head with two openings, this should not be construed as a limitation on the scope of this invention, since different types of reading means may be used without departing from the scope of the invention. The orientation between opening 101 and opening 103 of head 13 is such that angle 107 is substantially equivalent to angle 105, as will be subsequently explained if angle 107 and angle 105 are not equivalent, i.e., as reading means 13 moves across servo track 37 if angle 107 is not the mirror image of angle 105, then reading means 13 is off track and appropriate action will be taken so as to align reading means 13 with the appropriate data track.

The lower edge of tape 14, that is the tape's edge first encountered by reading means 13, includes a single servo track 37 having a second distinctive servo pattern or servo format in the form of magnetic indicia herein after 38 flux transitions 38 and 39. Flux transitions 338 and 39 comprise a plurality of separate or individual flux transitions, each one of which identifies the physical location of a data track. For example, data track 36 is identified by flux transition 38 while data track 40 is identified by flux transition 39. While not shown in FIG. 3 substantially the entire length of tape on reel 15 includes a large number of such closely packed data tracks. Servo track 37 includes a format having a plurality of distinctive flux transitions (38, 39), one of which identifies each of the transverse data tracks. Also, flux transition 38 is parallel to data either written into data track 36 or data read from data track 36.

Still referring to FIG. 3, servo track 37 also includes a first data pattern or servo format hereinafter called flux transition 111. Both flux transitions 38 and 111 of servo track 37 is read by reading means 13 and the information is used for aligning reading means 13 with an appropriate data track. Flux transition 111 is a substantially continuous flux transition parallel to the longitudinal edge of tape 14. The relationship between flux transition 38 and flux transition 111 is critical for obtaining proper servo information for aligning reading means 13 with the selected data track. As such, flux transition 111 is oriented in one direction, specifically in a direction parallel to the longitudinal edge of tape 14. Also, flux transition 38 is oriented in another direction, specifically in a direction inclined to flux transition 111. The relationship between flux transition 38 and flux transition 111 is such that angle 105 is formed.

In order to obtain proper servo information reading means 13 must cooperate with servo track 37 to obtain the servo information which is used for aligning reading means 13 with an appropriate data track. It is therefore important for reading means 13 to maintain a specific relationship with servo track 37. As such, opening 103 of reading means 13 is parallel to flux transition 111 while opening 101 is parallel to flux transition 38. Also, angle 107 is substantially identical with angle 105. With this arrangement as head 13 sweeps across servo track 37, opening 103 will output a signal from flux transition 111 when said opening 103 is in full alignment with flux transition 111, i.e., opening 103 of reading means 13 is sitting on top of flux transition 111. Similarly, opening 101 is parallel to flux transition 38 and will output a signal when opening 101 is in full alignment with flux transition 38. As will be explained in the operational section of this specification, the time difference between these two signals are used for aligning head 13 with a sclected data track.

Within the teachings of this invention, flux transition 111 need not be a continuous flux transition as is explained above. Flux transition 111 can be a plurality of distinct flux transitions each one respectively associating with a corresponding inclined flux transition, for example, flux transition 38 or 39. Also, angle 107 and angle 105 need not be substantially equal. However, whenever angle 107 is not substantially equal to angle 105 then, as will be described subsequently, additional circuitry will be added to the detection circuitry to compensate for the difference.

While the present invention is not to be limited thereto, the preferred form of the present invention includes a supply of tape 15 having a prerecorded servo track 37 and a blank data track area. As the tape's data track area is filled, each data track is placed in the correct position by first reading the servo track, and more particularly the position of a flux transition 38 or 39 relative to the path of head 13. If an alignment error exists, slight adjustment of the tape occurs, to achieve ideal head path 35 prior to enabling the write and read function of the magnetic tape unit. As will be appreciated by those of skill in the art, servo track 37 generally comprises a format of distinctive magnetic states which are positioned to identify the physical location of each of the transverse data tracks.

Figure 4:
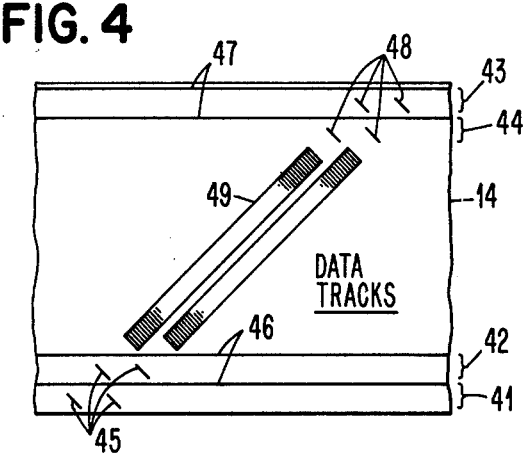
FIG. 4 shows another form of tape format having two servo track formats on each edge of the tape, to facilitate redundant sensing of head-to-track alignment and to facilitate measurement of the skew relationship between the head's path and the data track.

FIG. 4 shows another form of a servo format, generic to FIG. 3, wherein redundant sensing of head-to-track alignment can be accomplished, and wherein the skew relationship between the head's path and a data track can be measured. More specifically, this tape format includes two servo tracks 41 and 42 located near the bottom tape edge and two servo tracks 43 and 44 located near the upper tape edge. These servo tracks are identical, with the exception that they are offset, one from the other. Thus, a plurality of flux transitions 45–48 are used to provide redundant sensing of the relative position of the head path and the path of data track 49. Likewise, the position of the head as it enters the tape, at flux transitions 45 and 46 can be compared to the position of the head as it exits the tape, at flux transition 47 and 48 to provide a measure of the skew of the head track relative to the data track.

FIG. 5 discloses an enlarged view of the tape's servo format more generally disclosed in FIGS. 3 and 4, and additionally shows the details of one embodiment of FIG. 1's head/track alignment detecting network. In this figure the servo track is identified by reference numeral 50.

As previously described, servo track 50 is made up of a first flux transition 111 which is oriented in a direction parallel to the longitudinal edge of the tape; while a plurality of second flux transitions 38 are oriented in another direction inclined to the first flux transition. Each of the second flux transitions identify a data track.

Referring now to the head/track alignment detecting means of FIG. 5 and FIG. 6, the signal outputs from openings 101 and 103, as reading means 13 sweeps across servo track 50, appear on terminals 120 and 122, respectively. These output signals are applied to the input of threshold network 124. Threshold network 124 is a dual branch network having identical elements in each branch. The purpose of threshold network 124 is to detect when the signals from reading means 13 reaches a threshold magnitude. The signal from terminal 120 is fed into amplifier 123. The output of amplifier 123 is interconnected with differentiating circuit 126. The output of differentiating circuit 126 is interconnected to a conventional zero crossing detecting network 128 which determines the time when the signal from opening 101 is maximum. Likewise the other branch of threshold network 124 includes amplifier 130 with its output connected to differentiating circuits 132. The output of circuit 132 is connected to zero crossing network 134.

Referring now to FIG. 6, the signals from threshold network 124 appear on terminals 136 and 138, respectively. The signal on terminal 136 is delayed by delay means 140. As was previously mentioned, this delay is necessary to synchronize the signals if angle 105 and angle 107 are not substantially identical. Also, the delay means is used to adjust mechanical difference from machine to machine.

Error counter 142 hereinafter called counting means 142 receives signals on terminal 138 and from delay means 140. The function of counting means 142 is to determine the time lapse or time difference between the receipt of signals on terminal 138 and terminal 144.

More specifically, counting means 142 will begin to count on receipt of signals on either terminal 144 or terminal 138. Conversely counting means 142 will stop counting on receipt of signals on either terminals 144 or 138. Clock means 146 is interconnected to counting means 142. The function of clock means 146 is to supply clock pulses to the counting means and the residual count in the counting means is a measure of head/track alignment.

Still referring to FIG. 6, compare circuit 158 hereinafter called compare means 158 whose input is interconnected to counting means 142 by terminal 152 compares the output count of counting means 142 with a reference number on terminal 156. If head 13 is properly aligned with a selected data track the output from the compare means on terminal 162 is zero. Conversely, if the head is not properly aligned with a selected track a digital number will appear on terminal 162 which is indicative of the head/track misalignment. This signal on terminal 162 is also indicative of the time lapse between the signals received from reading means 13. As such the servo scheme of the present invention is time dependent. Terminal 162 interconnects the output from compare means 158 to a conventional bipolar digital-to-analog converter (DAC) 160. The DAC is capable of producing either a positive or negative signal on terminal 33. The signal on terminal 33 is used for controlling position servo 22. The sign of the error signal on terminal 33 depends on whether the reading means is to the right or to the left of the ideal head path as depicted in FIG. 3.

Whenever reading means 13 has read a selected track it is necessary to initialize or reset counting means 142 and compare means 158; so that the detecting means is ready for aligning the head with another selected track. The signal on terminal 30 is used for initializing counting means 142 and compare means 158.

Although the alignment detection means 32 has been described as a digital circuitry, this should be construed as only illustrative, since anyone skilled in the art would be able to derive an analog circuit which would function in a satisfactory manner.

Figure 7:
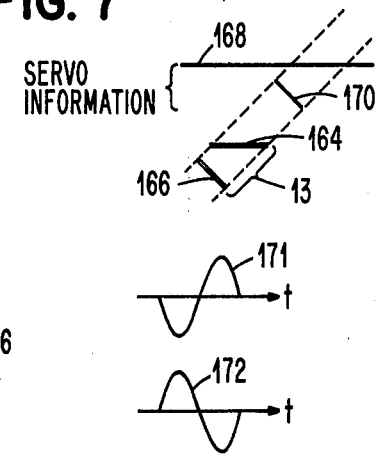
FIG. 7 shows the output signals from two heads when the heads are on track.

FIG. 7 depicts a situation wherein reading means 13 is in proper alignment with the servo information for a selected data track. In this figure, reading means 13 comprises erase head 164 and write head 166, while the servo patterns are depicted by flux transition 168 and flux transition 170. As the reading means sweeps across the servo track signal 171 is outputted from the erase head while signal 172 is outputted from the write head. These two signals are aligned timewise and as such the reading means is on track. In this configuration, the output from compare means 158 (FIG. 6) on terminal 162 is zero.

Figure 8:
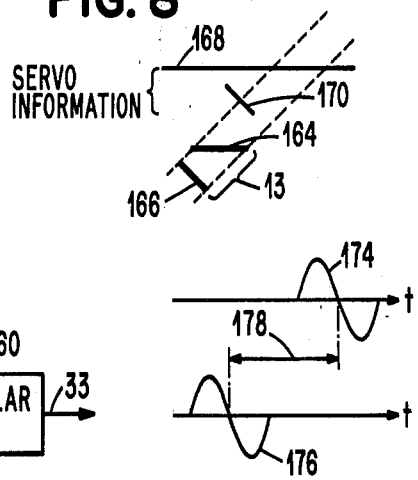
FIG. 8 shows the servo pattern with the heads off track and the output signals therefrom.

FIG. 8 shows a situation wherein reading means 13 is off track. In this condition as head 164 sweeps across flux transition 168, it will output signal 174. Likewise as head 166 sweeps across portion of flux transition 170, it will output a signal 176. However, signal 176 will be displaced a certain time interval 178 from signal 174. This displacement is a measure of head/track misalignment. In this configuration, the output from compare means 158 (FIG. 6) on terminal 162 is a positive or negative number indicative of head/track alignment.

Operation

In operation tape 14 having distinct servo patterns 111 and 38 is helically wrapped about the center of mandrel 11. In addition to the servo patterns tape 14 has a plurality of data tracks. Each of the data tracks is inclined to the edge of tape 14; while the data in each data track is parallel to servo pattern 38.

As rotating head wheel 12 rotates reading means 13 traces a transverse path across tape 14 for processing information, i.e., either reading the selected track or writing information in the selected track. There are two possible conditions that may occur. In the first situation, as depicted in FIG. 8, reading means 13 may be off track, i.e., to the right or left of the ideal head path (FIG. 3). In the second situation, as depicted in FIG. 7, reading means 13 is positioned on the ideal head path.

When, as was previously described, reading means 13 approaches a data track from the lower edge of the tape the ideal condition is to align reading means 13 with the selected track. As reading means 13 sweeps across servo track 37 a signal is outputted from opening 101 on terminal 120 and another signal is outputted from opening 103 on terminal 122. The signal on terminal 120 is indicative of the signal drive from flux transition 38 while the signal on terminal 122 is indicative of the signal from flux transition 111. Both signals are fed to amplifiers 123 and 130 for amplification. The signals are then differentiated by differentiating network 126 and 132. The signals are then fed to zero crossing network 128 and 134, respectively. The zero crossing networks determine the time when the signals from opening 101 and 103 are maximum.

If reading means 13 is on the ideal head path the signals arriving at counting means 142 from the zero crossing detection networks will be simultaneous. The output from counting means 142 on terminal 152 will be standard. This means that the output on terminal 152 when compared with a reference number in compare circuit means 142, the output of which appears on terminal 162 will be zero. This means the head is on track and there is no need for alignment.

On the other hand if reading means 13 is off track as reading means 13 sweeps across servo track 37, one of the signals from opening 101 and 103 will appear on terminal 136 or 138 before the other. For illustration purposes let us assume that the signal from opening 101, which appears on terminal 136, first arrives at counting means 142. This signal will start the counter as clock pulse from terminal 148 is fed into counter 142. When the signal on terminal 138 arrives at counter 142, the counter will stop counting. The residual count which is outputted on terminal 152 will be indicative of the off track error. This number will be compared with a standard reference number in compare means 158; in one embodiment of the invention a standard reference of 50 was used. The output of compare means 158 is either a positive or a negative number depending on whether reading means 13 is offset to the right or to the left of the ideal head path. The positive or negative number is fed into bipolar digital-to-analog converter 160 and the output of the digital-to-analog converter is fed to terminal 33. The signal of terminal 33 will be used in position servo 22 for energizing DC motor 21 for moving tape 14 so as to align reading means 13 with the selected data track.

Although the invention has been described with reference to magnetic transitions, it would be obvious to one skilled in the art that optical markings may be used to achieve head track alignment without departing from the scope of this invention.

While the invention has been particularly shown and described with reference to preferred embodiments thereof, it will be understood by those skilled in the art that various changes in form and details may be made therein without departing from the spirit and scope of the invention.

What is claimed is:

1. In a rotating head magnetic tape unit wherein a head wheel is being positioned to rotate in space relationship between upper and lower mandrel halves, the improvement in combination comprising:
    a length of magnetic media helically wrapped about said upper and lower mandrel halves, said length of magnetic media having servo track and data track thereon;
    said servo track including a servo format having first flux transition being parallel to the longitudinal edge of the magnetic media and second flux transition being inclined to said first flux transition and being parallel to said data track flux transitions;
    a single reading means operably associated with said magnetic media for reading the servo track to derive head/track alignment time dependent data and reading the data track for information data; and
    detection means operably connected to said reading means for receiving the time dependent information and using said time dependent information for proper head track alignment.

2. The magnetic recording unit as claimed in claim 1 wherein the servo format comprises a first flux transition having a longitudinal orientation parallel to the edge of magnetic media; and
    a plurality of second flux transitions incline to said first flux transition and parallel to the flux transitions comprising a transverse data track.

3. The magnetic unit as claimed in claim 1 wherein the reading means comprises a rotating head having a first gap parallel to the longitudinal edge of the tape and a second gap parallel to the flux transitions comprising the transverse data tracks.

4. The magnetic unit as defined in claim 1 wherein the detection means includes counting means, said counting means being responsive to a first and a second signal received from the reading means and for retaining a count indicative of the time lapse between the first signal and the second signal whereby said count is a measure of the alignment of said reading means with a data track.

5. The magnetic unit as claimed in claim 4 including tape servo means to control tape position in accordance with said count.

6. The magnetic unit as defined in claim 1 wherein the detection means further includes a threshold network for detecting the output signals from the reading means.

7. The magnetic unit as claimed in claim 6 wherein the threshold network comprises:
    amplifier means, operably connected to the reading means, for amplifying output signals, said output signals being derived from the servo pattern on the tape,
    differentiating means, operably connected to said amplifier means, for differentiating the amplified signals, and
    zero detecting means operably connected to the differentiating means for detecting the zero crossing of the differentiated signal.

8. In an improved rotating head magnetic tape unit having an improved servo format the improvement comprises:
    a length of magnetic tape having an improved servo format, said servo format comprising a first flux transitional path, said flux transitional path being oriented in a direction parallel to the longitudinal edge of the tape and a plurality of second flux transitional paths each being inclined at an angle to the first flux transitional path and parallel to the magnetic flux transition comprising a data track;
    a read head having a first opening oriented in a direction parallel to the longitudinal edge of the tape and a second opening parallel to the second flux transitional path of the tape, said second opening being inclined to the first opening so that the angle of inclination between the first and the second opening is substantially equal to the angle between the first and second flux transitional path on the tape, said head being operable for reading said servo format as the head crosses the tape;
    detection means having a plurality of circuit means operably connected to said read head for determining a count indicative of a time difference between a first signal and a second signal received from said read head whereby the time difference is a measure of head track alignment.

9. In an improved rotating head magnetic tape unit having an improved servo format the improvement comprises:
a length of magnetic tape having an improved servo format, said servo format comprising a first flux transitional path, said flux transitional path being oriented in a direction parallel to the longitudinal edge of the tape and a plurality of second flux transitional paths, each being inclined at an angle to the first flux transitional path and parallel to the magnetic flux transition comprising a data track;
a read head having a first opening oriented in a direction parallel to the longitudinal edge of the tape, and a second opening parallel to the second flux transitional paths of the tape, said head being operable for reading said servo format as the head crosses the tape;
delay means operably connected to the read head for synchronizing the head signals;
detection means having a plurality of circuit means operably connected to said read head for determining a count indicative of a time difference between a first signal and a second signal received from said read head whereby the time difference is a measure of head track alignment.

10. In a rotating head magnetic tape unit, improved means for maintaining head to data track alignment, comprising:
a length of magnetic tape having a longitudinal servo format recorded thereon, said servo format including a first magnetic transition oriented in one direction and a plurality of second magnetic transitions oriented in a second direction inclined to said first direction, each of said second transitions defining the physical location of an associated transverse data track,
reading means including said rotating head having a first gap parallel to said first transition and a second gap parallel to said second transition and operable to read said servo format as said head sweeps across said format; and
time responsive circuit means controlled by the output signal produced by each of said two gaps as the gap comes into parallel oriented servo format transition.

11. In combination:
a magnetic recording tape having a first continuous longitudinal control track and a second control track inclined to said first control tack recorded thereon, and adapted to have transverse data tracks extending at an angle to the first control track,
said control tracks being recorded with a format so that the second controlled track is positioned to identify the physical location of the data tracks,
a magnetic transducer having a first and a second opening with an angle substantially identical with the angle between the control tracks on the tape and movable across said tape at an angle corresponding to the angle of said data track,
a counting means,
clock means having an output connected to be counted by said counter,
counter control means responsive to the output of said transducer as it reads said control tracks, said control means being operable to enable said counter to begin counting as said head begins to sweep across said control tacks, to thereafter stop said counter from counting, and to thereafter inhibit said counter as said head completes said sweep across said control tracks,
compare means operable after said counter is inhibited for comparing the output of said counter with a predetermined number, and
means operable after said compare means to decode the residual state of said compare means as a measure of the alignment of said transducer with the data track whose position is identified by said second control track.

12. The combination defined in claim 11 wherein the position of each data track is identified by one of said second transition state, wherein said counter is enabled and thereafter inhibited by a minimum signal threshold detector responsive to the output of said transducer, and wherein the counter's state of counting is changed upon the detection of said second or first control track.

13. The combination defined in claim 11 including tape servo means controlled by the residual state of said counter and operable to control the position of said tape in accordance therewith.

14. The combination defined in claim 11 wherein the position of each data track is identified by a flux transition state of the second control track and wherein said counter is enabled by said flux transition state of said second control track and is inhibited by said flux transition state of the first control track whereby the counter's state of counting is changed upon the detection of a null signal in the output of said transducer.

15. The combination defined in claim 11 including tape servo means controlled by the residual state of said counter and operable to control the position of said tape in accordance therewith.

16. Closed loop tape servo apparatus for use in controlling the relative tape-to-head position in a rotating head, transverse recording magnetic tape unit, comprising:
a tape processing station having a rotating head,
a movable length of tape extending through said station,
means applying tension to one end of said tape,
motor means applying tension to the other end of said tape, said motor means being servo controllable to change the position of the tape's transverse data tracks adjacent the path of said rotating head,
at least two distinctive servo indicia recorded on said tape, said servo indicia including a first flux transition being oriented substantially parallel to the tape's edge and a plurality of second flux transition inclined at an angle to the first flux transition,
counter means,
clock means operably connected to selectively increment said counter means,
control means connected to control said counter and to be controlled by said rotating head, said control means being responsive to determine a time difference between first and second head signals as the head sweeps across said servo tracks to cause said counter to count, the count being determined by the positional relationship of the servo indicia patterns to said rotating head path, and
servo means connecting the count within said counter at the end of said sweep to control the energization of said motor means in a sense to reduce said count to a given value.

17. The servo apparatus of claim 16 including means operable to rotate said head at a known constant speed.

18. The servo apparatus defined in claim 16 wherein said clock means includes a constant frequency data pattern as a portion of said servo track.

19. The servo apparatus defined in claim 17 wherein each transverse data track is identified by one of the plurality of second flux transitions and wherein said counter begins to count on receiving head signal indicative of said second flux transition and stops counting on receiving head signal indicative of the first flux transition.

20. The servo apparatus defined in claim 18 wherein each transverse data track is identified by one of the plurality of second flux transitions and wherein said counter begins to count on receiving head signal indicative of the first flux transition and stops counting on receiving head signal indicative of said second flux transition.

\* \* \* \* \*